United States Patent
Kikukawa et al.

(10) Patent No.: US 7,859,968 B2
(45) Date of Patent: Dec. 28, 2010

(54) INFORMATION READOUT METHOD FOR NON MASK LAYER TYPE OPTICAL INFORMATION MEDIUM

(75) Inventors: Takashi Kikukawa, Tokyo (JP); Tatsuya Kato, Tokyo (JP); Hajime Utsunomiya, Tokyo (JP); Hiroshi Shingai, Tokyo (JP)

(73) Assignee: TDK Corporation, Tokyo (JP)

( * ) Notice: Subject to any disclaimer, the term of this patent is extended or adjusted under 35 U.S.C. 154(b) by 168 days.

(21) Appl. No.: 12/352,304

(22) Filed: Jan. 12, 2009

(65) Prior Publication Data

US 2009/0135711 A1 May 28, 2009

Related U.S. Application Data

(62) Division of application No. 10/125,476, filed on Apr. 19, 2002, now Pat. No. 7,496,019.

(30) Foreign Application Priority Data

Apr. 20, 2001 (JP) ............................. 2001-123521
Mar. 28, 2002 (JP) ............................. 2002-093026

(51) Int. Cl.
*G11B 7/0045* (2006.01)

(52) U.S. Cl. ................................... 369/59.11

(58) Field of Classification Search ........................ None
See application file for complete search history.

(56) References Cited

U.S. PATENT DOCUMENTS

| | | | |
|---|---|---|---|
| 4,973,520 A | 11/1990 | Takada et al. | |
| 5,136,573 A | 8/1992 | Kobayashi | |
| 5,461,602 A | 10/1995 | Moriya et al. | |
| 5,615,206 A | 3/1997 | Yanagisawa et al. | |
| 5,726,970 A | 3/1998 | Kaneko et al. | |
| 5,888,680 A | 3/1999 | Ohbayashi et al. | |
| 6,125,085 A | 9/2000 | Fuji et al. | |

(Continued)

FOREIGN PATENT DOCUMENTS

EP 0957477 11/1999

(Continued)

*Primary Examiner*—Peter Vincent Agustin
(74) *Attorney, Agent, or Firm*—Oblon, Spivak, McClelland, Maier & Neustadt, L.L.P.

(57) ABSTRACT

An information readout method for an optical information medium comprising an information recording layer having pits or recorded marks representative of information data involves the step of irradiating a laser beam to the information recording layer through an objective lens for providing readings of the pits or recorded marks. When the laser beam has a wavelength $\lambda$ of 400 to 410 nm, the objective lens has a numerical aperture NA of 0.70 to 0.85, and the pits or recorded marks have a minimum size $P_L$ of up to $0.36\lambda/NA$, readout is carried out at a power Pr of at least 0.4 mW for the laser beam. When the laser beam has a wavelength $\lambda$ of 630 to 670 nm, the objective lens has a numerical aperture NA of 0.60 to 0.65, and the pits or recorded marks have a minimum size $P_L$ of up to $0.36\lambda/NA$, readout is carried out at a power Pr of at least 1.0 mW for the laser beam. Pits or recorded marks of a size approximate to the resolution limit determined by diffraction can be read out at a high C/N.

12 Claims, 10 Drawing Sheets

U.S. PATENT DOCUMENTS

| | | | |
|---|---|---|---|
| 6,154,326 | A | 11/2000 | Ueyanagi et al. |
| 6,175,548 | B1 | 1/2001 | Kashiwagi |
| 6,187,406 | B1 | 2/2001 | Ichihara et al. |
| 6,343,056 | B2 | 1/2002 | Miyamoto et al. |
| 6,411,591 | B1 | 6/2002 | Moritani et al. |
| 6,424,610 | B2 | 7/2002 | Ohno |
| 6,511,788 | B1 | 1/2003 | Yasuda et al. |
| 6,512,735 | B1 | 1/2003 | Takeda et al. |
| 6,524,766 | B1 | 2/2003 | Ariyoshi et al. |
| 6,606,291 | B2 | 8/2003 | Ichihara et al. |
| 6,744,717 | B2 | 6/2004 | Ichihara et al. |
| 2001/0012257 | A1 | 8/2001 | Suzuki et al. |
| 2001/0026856 | A1 | 10/2001 | Ichihara et al. |
| 2003/0193857 | A1 | 10/2003 | Ichihara et al. |

FOREIGN PATENT DOCUMENTS

| | | |
|---|---|---|
| EP | 1011099 | 6/2000 |
| EP | 1011101 | 6/2000 |
| EP | 1028421 | 8/2000 |
| EP | 1047056 | 10/2000 |
| EP | 1074984 | 2/2001 |
| EP | 1 094 454 A1 | 4/2001 |
| EP | 1372146 | 12/2003 |
| EP | 1 081 692 B1 | 4/2009 |
| JP | 63-214936 | 9/1988 |
| JP | 1-184641 | 7/1989 |
| JP | 05-205314 | 8/1993 |
| JP | 6-60425 | 3/1994 |
| JP | 7-14210 | 1/1995 |
| JP | 7-307025 | 11/1995 |
| JP | 08-96412 | 4/1996 |
| JP | 2844824 | 10/1998 |
| JP | 10-340482 | 12/1998 |
| JP | 11-86287 | 3/1999 |
| JP | 11-86342 | 3/1999 |
| JP | 2000-163823 | 6/2000 |
| JP | 2000-339784 | 12/2000 |
| JP | 2001-23243 | 1/2001 |
| JP | 2001-83410 | 3/2001 |
| JP | 2001-084643 | 3/2001 |
| WO | WO 00/00965 | 1/2000 |
| WO | WO 01/16947 | 8/2001 |

INFORMATION READOUT METHOD FOR NON MASK LAYER TYPE OPTICAL INFORMATION MEDIUM

CROSS-REFERENCE TO RELATED APPLICATIONS

This application is a Divisional of and claims the benefit of priority under 35 U.S.C. §120 from U.S. Ser. No. 10/125,476, filed Apr. 19, 2002, now U.S. Pat. No. 7,496,019, and claims the benefit of priority under 35 U.S.C. §119 from Japanese Patent Application No. 2001-123521, filed Apr. 20, 2001 and 2002-093026, filed Mar. 28, 2002.

This invention relates to a method and apparatus for reading out information in an optical information medium.

BACKGROUND OF THE INVENTION

Optical information media include read-only optical discs such as compact discs, rewritable optical recording discs such as magneto-optical recording discs and phase change optical recording discs, and write-once optical recording discs using organic dyes as the recording material.

Nowadays, optical information media are required to further increase their information density in order to process a vast quantity of information as in images. The information density per unit area can be increased either by narrowing the track pitch or by reducing the space between recorded marks or between pits to increase a linear density. However, if the track density or linear density is too high relative to the beam spot of reading light, the carrier-to-noise (C/N) ratio lowers, eventually to a level where signals are unreadable. The resolution upon signal readout is determined by the diameter of a beam spot. More illustratively, provided that the reading light has a wavelength $\lambda$ and the optical system of the reading equipment has a numerical aperture NA, the spatial frequency $2 NA/\lambda$ generally becomes a resolution limit. Accordingly, reducing the wavelength of reading light and increasing the NA are effective means for improving the C/N and resolution upon readout. A number of technical studies that have been made thus far reveal that many technical problems must be solved before such effective means can be introduced.

Under the circumstances, several methods have been proposed for going over the resolution limit (or diffraction limit) determined by light diffraction. They are generally known as super-resolution readout methods.

The most common super-resolution readout method is to form a mask layer over a recording layer. Based on the fact that a laser beam defines a spot having an intensity distribution approximate to the Gaussian distribution, an optical aperture smaller than the beam spot is formed in the mask layer whereby the beam spot is reduced below the diffraction limit. This method is generally divided into a heat mode and a photon mode, depending on the optical aperture-forming mechanism.

The heat mode is such that upon irradiation to a beam spot, the mask layer changes its optical properties in a region whose temperature is raised above a certain value. The heat mode is utilized, for example, in the optical disc disclosed in JP-A 5-205314. This optical disc has on a transparent substrate in which optically readable recorded pits are formed in accordance with information signals, a layer of a material whose reflectance changes with temperature. That is, the material layer serves as a mask layer. The elements described in JP-A 5-205314 as the material of which the mask layer is constructed are lanthanoids, with Tb being used in Examples. In the optical disc of JP-A 5-205314, when reading light is irradiated, the reflectance of the material layer changes due to temperature distribution within the scanned spot of the reading light. After reading operation, the reflectance resumes the initial state as the temperature lowers. It never happens that the material layer be melted during reading. Another known example of the heat mode is a medium capable of super-resolution readout, as disclosed in Japanese Patent No. 2,844,824, the medium having a mask layer of an amorphous-crystalline phase transition material in which a high-temperature region created within a beam spot is transformed into crystal for increasing the reflectance. This medium, however, is impractical in that after reading, the mask layer must be transformed back to amorphous.

The heat mode media require that the readout optical power be strictly controlled in consideration of various conditions including the linear velocity of the medium since the size of the optical aperture depends solely on the temperature distribution in the mask layer. This, in turn, requires a complex control system and hence, an expensive medium drive. The heat mode media also suffer from the problem that reading characteristics degrade with the repetition of reading operation because the mask layer is prone to degradation by repetitive heating.

On the other hand, the photon mode is such that upon exposure to a beam spot, the mask layer changes its optical properties in a region whose photon intensity is increased above a certain value. The photon mode is utilized, for example, in the information recording medium of JP-A 8-96412, the optical recording medium of JP-A 11-86342, and the optical information recording medium of JP-A 10-340482. More illustratively, JP-A 8-96412 discloses a mask layer formed of phthalocyanine or a derivative thereof dispersed in a resin or inorganic dielectric, and a mask layer formed of a chalcogenide. JP-A 11-86342 uses as the mask layer a super-resolution readout film containing a semiconductor material having a forbidden band which upon exposure to reading light, is subject to electron excitation to the energy level of excitons to change light absorption characteristics. One illustrative mask layer is CdSe microparticulates dispersed in a $SiO_2$ matrix. JP-A 10-340482 uses as the mask layer a glass layer in which the intensity distribution of transmitted light varies non-linearly with the intensity distribution of irradiated light.

Unlike the super-resolution readout media of the heat mode, the super-resolution readout media of the photon mode are relatively resistant to degradation by repetitive reading.

In the photon mode, the region whose optical characteristics change is determined by the number of incident photons which in turn, depends on the linear velocity of the medium relative to the beam spot. Also in the photon mode, the size of an optical aperture depends on the power of reading light, indicating that supply of an excessive power makes so large an optical aperture that super-resolution readout may become impossible. Therefore, the photon mode also requires to strictly control the power of reading light in accordance with the linear velocity and the size of pits or recorded marks (objects to be read out). Additionally, the photon mode requires to select the mask layer-forming material in accordance with the wavelength of reading light. That is, the photon mode media are rather incompatible with multi-wavelength reading.

Even in the case of recorded marks or pits of a large size which do not need super-resolution readout, a fully high C/N is not available if the size is approximate to the resolution limit determined by light diffraction.

SUMMARY OF THE INVENTION

An object of the invention is to provide a readout method for an optical information medium having pits or recorded marks of a size approximate to the resolution limit determined by diffraction, which method provides readings of the pits or recorded marks at a high C/N.

A first embodiment of the invention provides an information readout method for an optical information medium comprising an information recording layer having pits or recorded marks representative of information data. The method includes the step of irradiating a laser beam to the information recording layer through an objective lens for providing readings of the pits or recorded marks. When the laser beam having a wavelength λ of 400 to 410 nm is irradiated through the objective lens having a numerical aperture NA of 0.70 to 0.85 to the pits or recorded marks having a minimum size $P_L$ of up to 0.36λ/NA, the laser beam is given a power Pr of at least 0.4 mW. The minimum size $P_L$ is preferably up to 0.31λ/NA and also preferably, at least 0.25λ/NA. The power Pr is preferably at least 0.45 mW and more preferably at least 0.5 mW.

A second embodiment of the invention provides an information readout method for an optical information medium comprising an information recording layer having pits or recorded marks representative of information data. The method includes the step of irradiating a laser beam to the information recording layer through an objective lens for providing readings of the pits or recorded marks. When the laser beam having a wavelength λ of 630 to 670 nm is irradiated through the objective lens having a numerical aperture NA of 0.60 to 0.65 to the pits or recorded marks having a minimum size $P_L$ of up to 0.36λ/NA, the laser beam is given a power Pr of at least 1.0 mW. The minimum size $P_L$ is preferably up to 0.27λ/NA and also preferably at least 0.25λ/NA. The power Pr is preferably at least 1.4 mW, more preferably at least 2.0 mW, and even more preferably at least 2.2 mW.

Readout apparatus used in the information readout methods of the first and second embodiments are also contemplated herein.

DESCRIPTION OF THE PREFERRED EMBODIMENT

Figure 1:
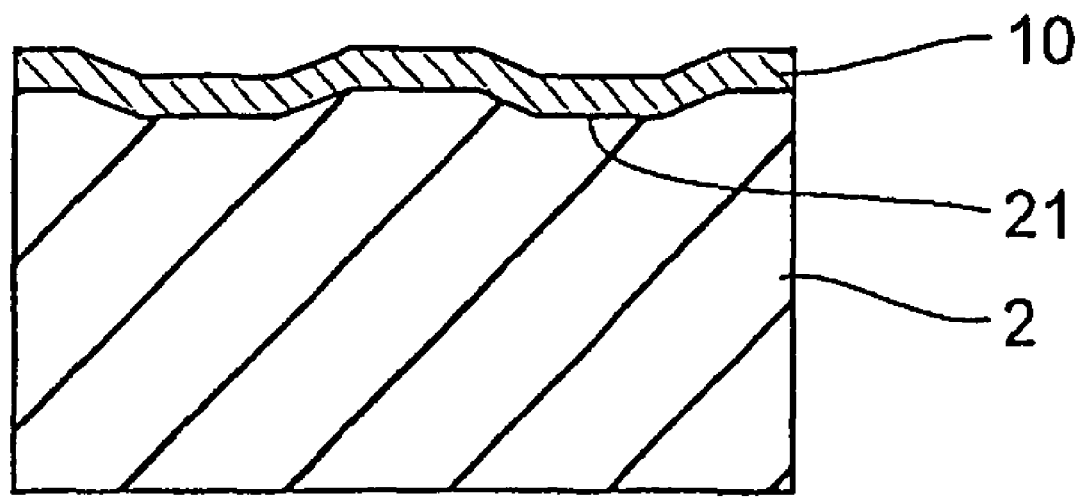
FIG. 1 is a fragmentary cross-sectional view of an optical information medium according to one embodiment of the invention.

The information readout method of the invention is applied to an optical information medium which includes a specific layer to be referred to as "functional layer," hereinafter. According to the invention, pits or recorded marks are read out by irradiating a laser beam thereto through a readout light irradiating optical system while setting the readout power Pr of the laser beam within a specific range in accordance with the readout wavelength and the optical system. This setting enables super-resolution readout beyond the resolution limit determined by light diffraction. In addition, the invention achieves a higher C/N ratio than in the prior art, when the pits or recorded marks having a size approximate to and slightly greater than the resolution limit are read out.

In the first embodiment of the invention, the laser beam used in reading of pits or recorded marks (simply abbreviated as "pit/mark," hereinafter) has a wavelength λ of 400 to 410 nm. The laser beam is irradiated to the medium through an objective lens having a numerical aperture NA of 0.70 to 0.85.

Since the cutoff spatial frequency is 2 NA/λ, rows of pits/marks in which the pit/mark length is equal to the space between adjacent pits/marks are readable as long as the spatial frequency is equal to or below 2 NA/λ (line pairs/nm). The pit/mark length (=space length) corresponding to the readable spatial frequency is given as

λ/4 NA=0.25λ/NA.

It is then concluded that super-resolution readout is possible if a C/N is obtained from a pit/mark row with a pit/mark length of less than 0.25λ/NA. Notably, the first embodiment is characterized in that a high C/N is available upon reading of pits/marks which are slightly larger than the resolution limit. Then in the first embodiment, the pits/marks preferably have a minimum size $P_L$ of at least 0.25λ/NA. Since too large a minimum size $P_L$ of pits/marks compromises the benefits of the first embodiment, the upper limit of the minimum size $P_L$ is 0.36λ/NA, which is slightly larger than the resolution limit, and preferably up to 0.31λ/NA.

In the first embodiment, the laser beam irradiated for readout should have a power Pr of at least 0.4 mW, preferably at least 0.45 mW, and more preferably at least 0.5 mW. In the situation that the wavelength λ and the numerical aperture NA are within the limited ranges according to the first embodiment, when pits/marks having the above-defined size approximate to the resolution limit corresponding to the λ and NA are read out, a satisfactory C/N is available as long as the readout power Pr is within the range limited by the first embodiment.

In the second embodiment of the invention, the laser beam used in reading of pits/marks has a wavelength λ of 630 to 670 nm. The laser beam is irradiated to the medium through an objective lens having a numerical aperture NA of 0.60 to 0.65.

The second embodiment is also characterized in that a high C/N is available upon reading of pits/marks which are slightly larger than the resolution limit. Then in the second embodiment, the pits/marks preferably have a minimum size $P_L$ of at least 0.25λ/NA. Since too large a minimum size $P_L$ of pits/marks compromises the benefits of the second embodiment, the upper limit of the minimum size $P_L$ is 0.36λ/NA, which is slightly larger than the resolution limit, and preferably up to 0.27λ/NA.

In the second embodiment, the laser beam irradiated for readout should have a power Pr of at least 1.0 mW, preferably at least 1.4 mW, more preferably at least 2.0 mW, and even more preferably at least 2.2 mW. In the situation that the wavelength λ and the numerical aperture NA are within the limited ranges according to the second embodiment, when pits/marks having the above-defined size approximate to the resolution limit corresponding to the λ and NA are read out, a satisfactory C/N is available as long as the readout power Pr is within the range limited by the second embodiment.

It is noted that in the first and second embodiments, no particular upper limit is imposed on the readout power Pr. In general, the C/N becomes higher as the readout powder Pr increases. However, if the readout power Pr is high, the functional layer can be degraded by readout operation or repetition thereof. With a high readout power Pr, a reflected light detecting system of the medium readout apparatus can be saturated when the medium has a certain reflectance, disabling readout operation. These restraints impose a substantial upper limit on the readout power Pr.

Although the reason why the C/N is significantly improved in proximity to the resolution limit by providing the functional layer is not well understood, the inventors believe that the mechanism described below participates therein.

Figure 2:
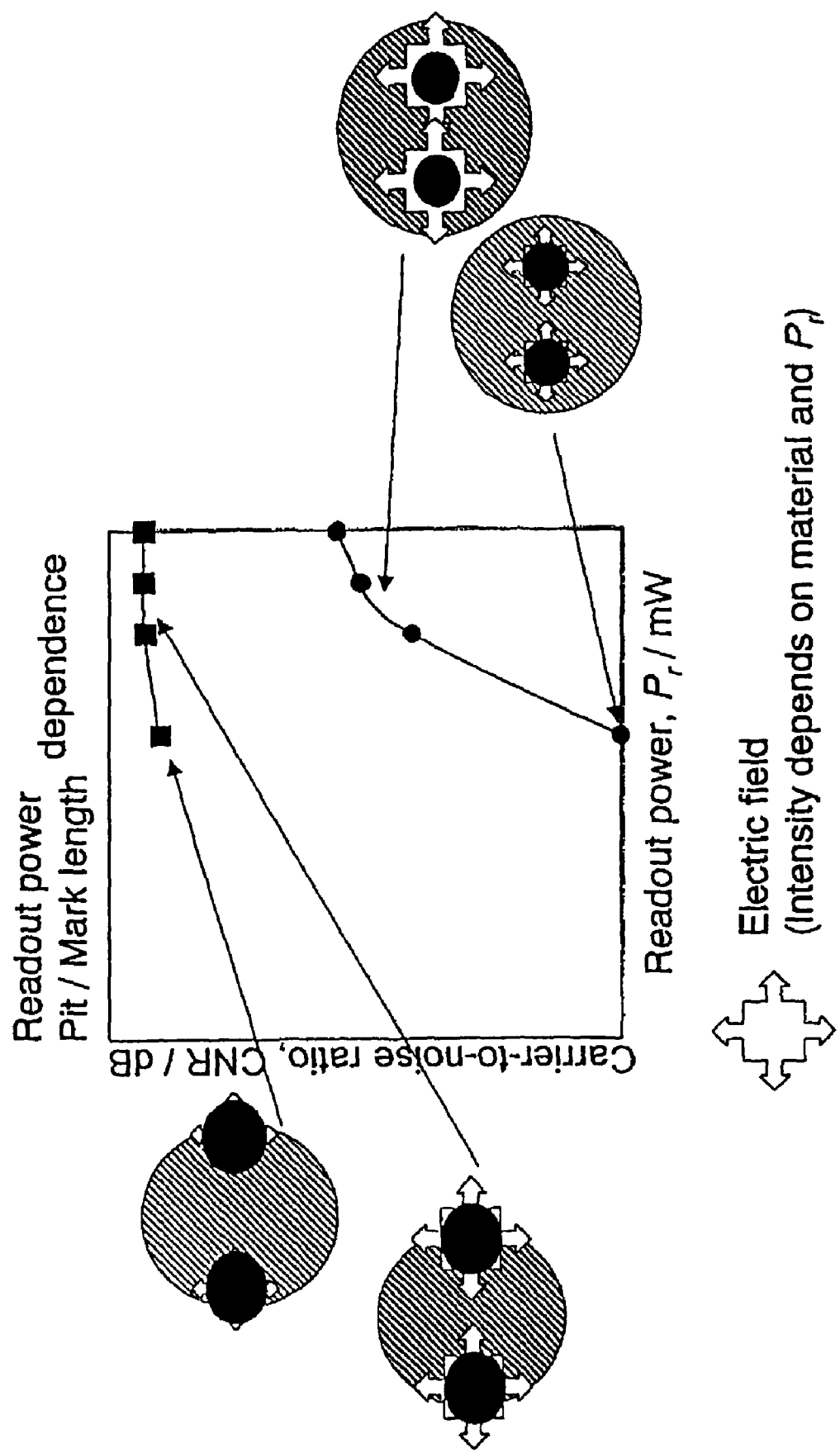
FIG. 2 schematically illustrates the operation of the invention.

The inventors presume as follows. When a laser beam is irradiated to pits/marks, electric fields are created around the pits/marks as shown in FIG. 2. The intensity of the electric field or the extent to which the electric field covers is correlated to the energy density on the laser beam irradiated surface, that is, the energy per unit area of the irradiated surface and the material of which the irradiated surface is made. When the distance between adjacent pits/marks is relatively short, an interaction occurs between the electric fields of adjacent pits/marks, which enables super-resolution readout. This electric field is likely to generate near an edge when a structure has an edge like pits. The electric field is also likely to generate at the site where dielectric constant or electric conductivity sharply changes, such as the boundary between crystalline and amorphous phases, like the outer periphery of amorphous recorded marks in phase change optical recording media.

The interaction depends on the energy density of the laser beam. Then the interaction becomes stronger in proportion to the readout power Pr, if the readout wavelength λ and the numerical aperture NA of the readout optical system are the same. As a consequence, the C/N becomes higher as the readout power Pr increases. Besides, the laser beam spot diameter is in proportion to λ/NA, which indicates that with the readout power Pr kept fixed, the C/N becomes higher as the readout wavelength λ is shorter and as the numerical aperture NA is larger. Inversely, if λ/NA is small, an equivalent C/N is obtainable with a lower readout power Pr.

On the other hand, when the distance between adjacent pits/marks is relatively long, the above-described interaction does not occur, or only a little interaction occurs if any, or the signal component produced by the interaction is small as compared with the signal component produced by ordinary readout operation. As a result, the C/N improvement dependent on the readout power Pr is not ascertained or is extremely little if any.

It is noted that for a medium having a mask layer (described in the preamble), as is evident from the operation principle of the mask layer, effects are achieved only when pits or recorded marks, which are objects to be read out, have a small size below the resolution limit. The medium fails to produce a higher C/N than the prior art mask layer-free media when the objects to be read out have a size slightly larger than the resolution limit.

The present invention is of great worth in the industry. Optical discs featuring the highest recording density among the currently available optical discs are DVD. DVD-RW, which is DVD for Re-Recordable Disc, has a phase change recording layer, which functions as the functional layer. For the readout operation of DVD-RW, the readout wavelength λ and numerical aperture NA fall within the second embodiment of the invention. Therefore, the application of the second embodiment to DVD-RW enables super-resolution readout and significantly improves the C/N in proximity to the resolution limit.

Figure 3:
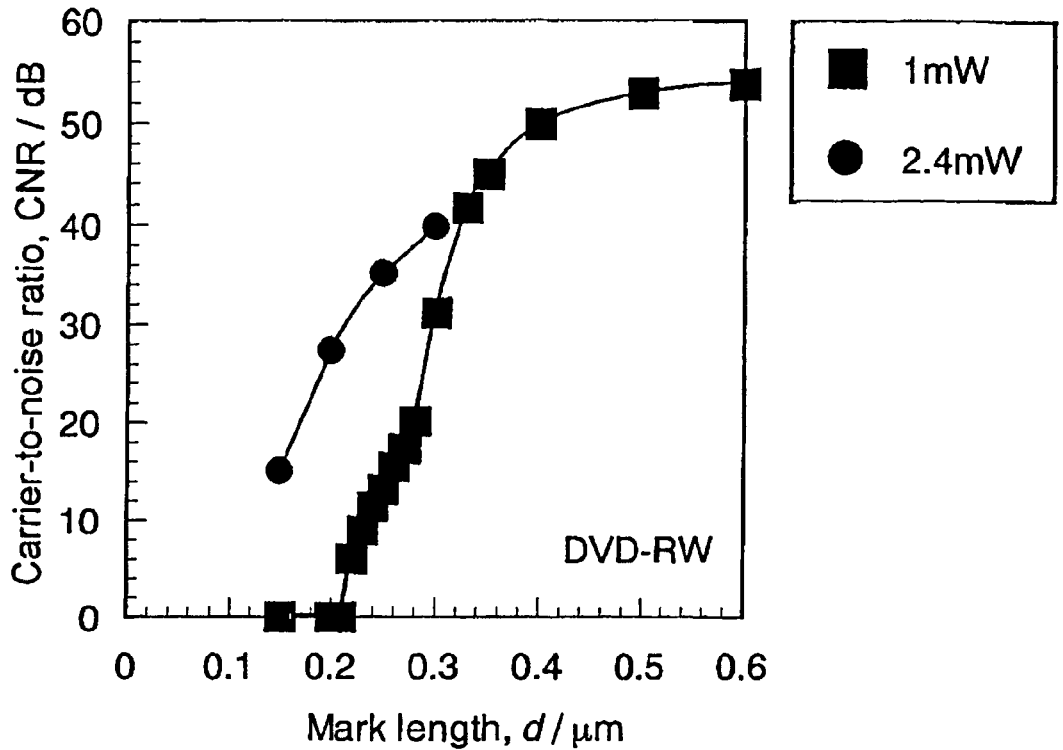
FIG. 3 is a graph of C/N versus mark length.

The inventors carried out an experiment of applying the second embodiment of the invention to a commercially available DVD-RW disc (manufactured by TDK Corporation). In this experiment, the readout wavelength λ was 650 nm, and the objective lens of the readout optical system had a numerical aperture NA of 0.60 according to the DVD-RW standards. The results are shown in FIG. 3. In FIG. 3, when the readout power Pr is 1 mW, a C/N of about 20 to 30 dB is obtained at a mark length of 0.28 to 0.3 μm which is approximate to the resolution limit (0.271 μm). Also in FIG. 3, when the readout power Pr is 2.4 mW, a C/N of about 40 dB is obtained at a mark length of 0.28 to 0.3 μm which is approximate to the resolution limit, indicating that fully practical readout is possible. Namely, the present invention permits a conventional optical disc to achieve a substantial C/N improvement in proximity to the resolution limit simply by increasing the readout power Pr.

In the disclosure, the medium is considered readable (readout is possible) when a C/N of at least 20 dB is obtained. For the medium to find practical use, a C/N of preferably at least about 30 dB and more preferably at least about 40 dB is necessary.

Figure 4:
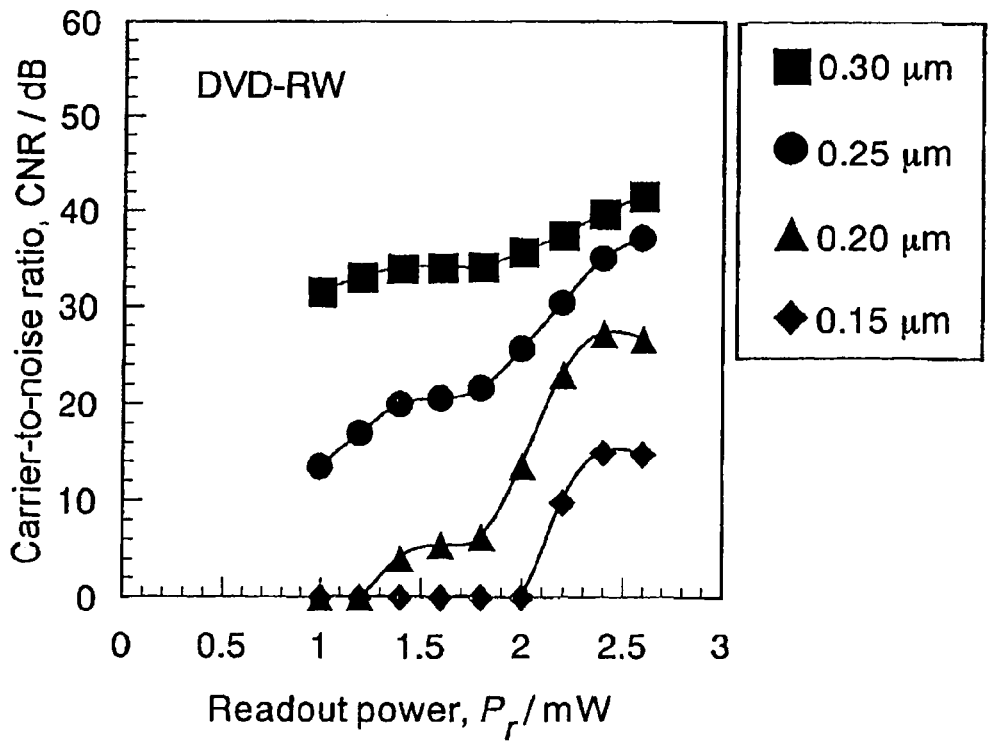
FIG. 4 is a graph of C/N versus readout power.

FIG. 4 is a graph of C/N versus readout power Pr when recorded marks of different length are read out in the above-described DVD-RW disc. It is evident from FIG. 4 that the C/N improves in proximity to the resolution limit as the readout power Pr increases.

Figure 5:
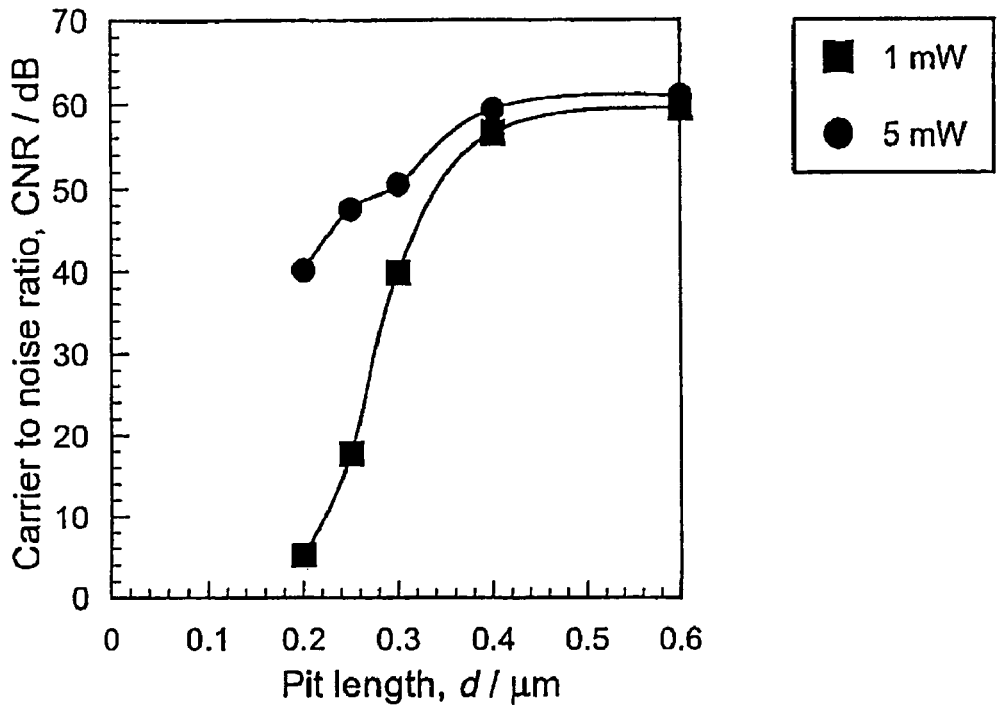
FIG. 5 is a graph of C/N versus pit length.

The inventors also carried out an experiment of applying the second embodiment of the invention to a read-only memory (ROM) type disc. This ROM disc includes a resin substrate on which pits having a length shown in FIG. 5 are arrayed in rows, a Ge layer of 15 nm thick formed thereon as a reflecting and functional layer, and a protective layer formed thereon of a UV-curable resin to a thickness of 10 μm. In the pit row, the space between adjacent pits is equal to the length of pits.

For C/N measurement, readout operation was carried out on the ROM disc using a laser beam having a readout wavelength λ of 635 nm and the objective lens of the readout optical system having a numerical aperture NA of 0.60. The results are shown in FIG. 5. Under these readout conditions, pits having a length of 0.3 μm are, for the most part, readable, but their size is approximate to the resolution limit (0.265 μm), and pits having a length of 0.25 μm or less are, for the most part, unreadable. FIG. 5 shows C/N as a function of pit length when the readout power is 1 mW or 5 mW. It is seen from FIG. 5 that at a pit length of 0.4 μm or more, approximately equal C/N is obtainable from both the readout powers, but at a pit length of 0.3 μm or less, the C/N increases as the readout power rises. More specifically, when pits having a length of 0.2 to 0.3 μm are to be read out, the readout power of 1 mW provides a C/N of less than 40 dB, and the readout power of 5 mW provides a C/N of more than 40 dB, indicating that fully practical readout is possible.

Figure 6:
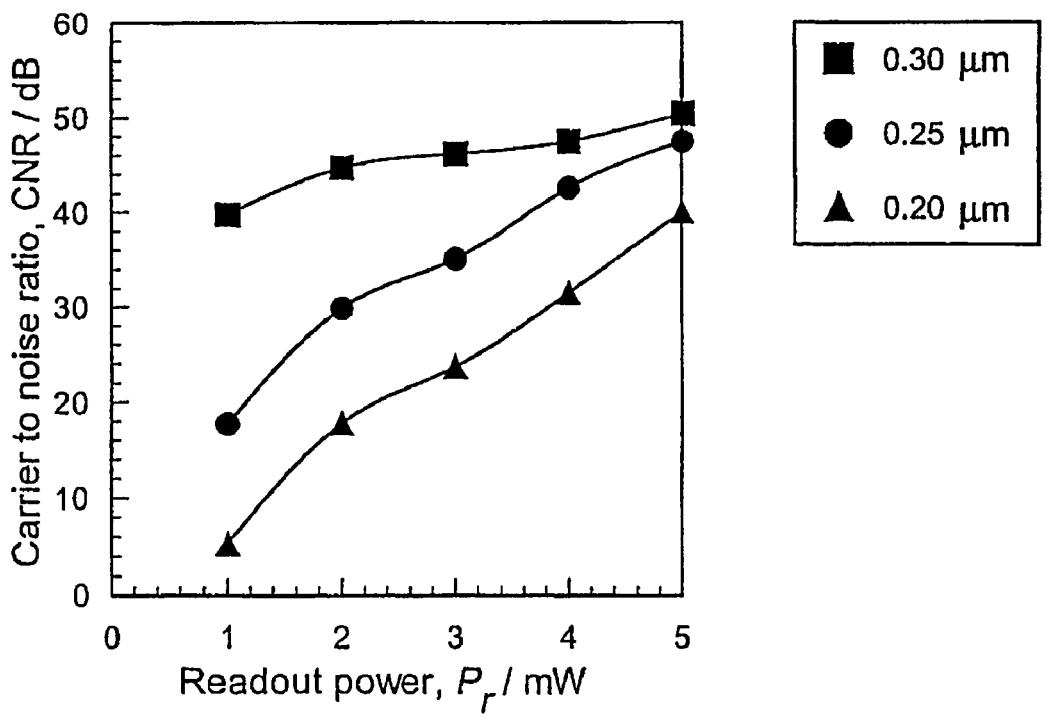
FIG. 6 is a graph of C/N versus readout power.

FIG. 6 shows C/N as a function of a readout power when the pit length is 0.3 μm, 0.25 μm or 0.2 μm. It is clearly seen from FIG. 6 that when pits having a size which is generally readable and approximate to the resolution limit are to be read out, the C/N improves in proportion to the increasing readout power.

Figure 7:
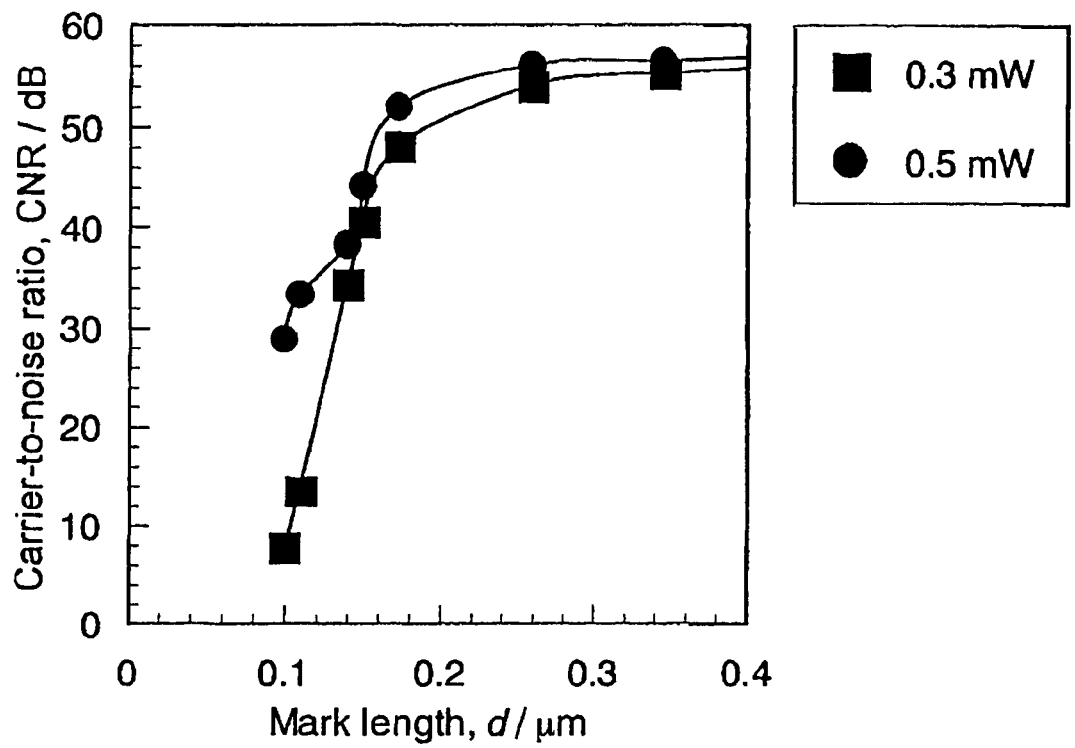
FIG. 7 is a graph of C/N versus mark length.
Figure 8:
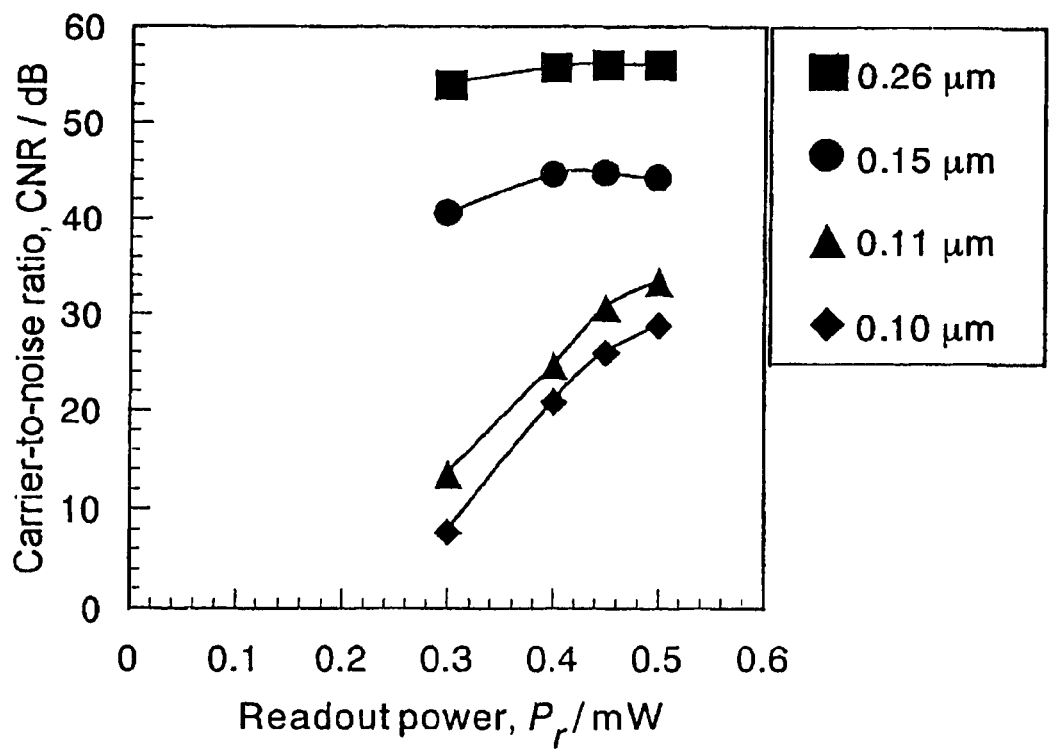
FIG. 8 is a graph of C/N versus readout power.
Figure 9:
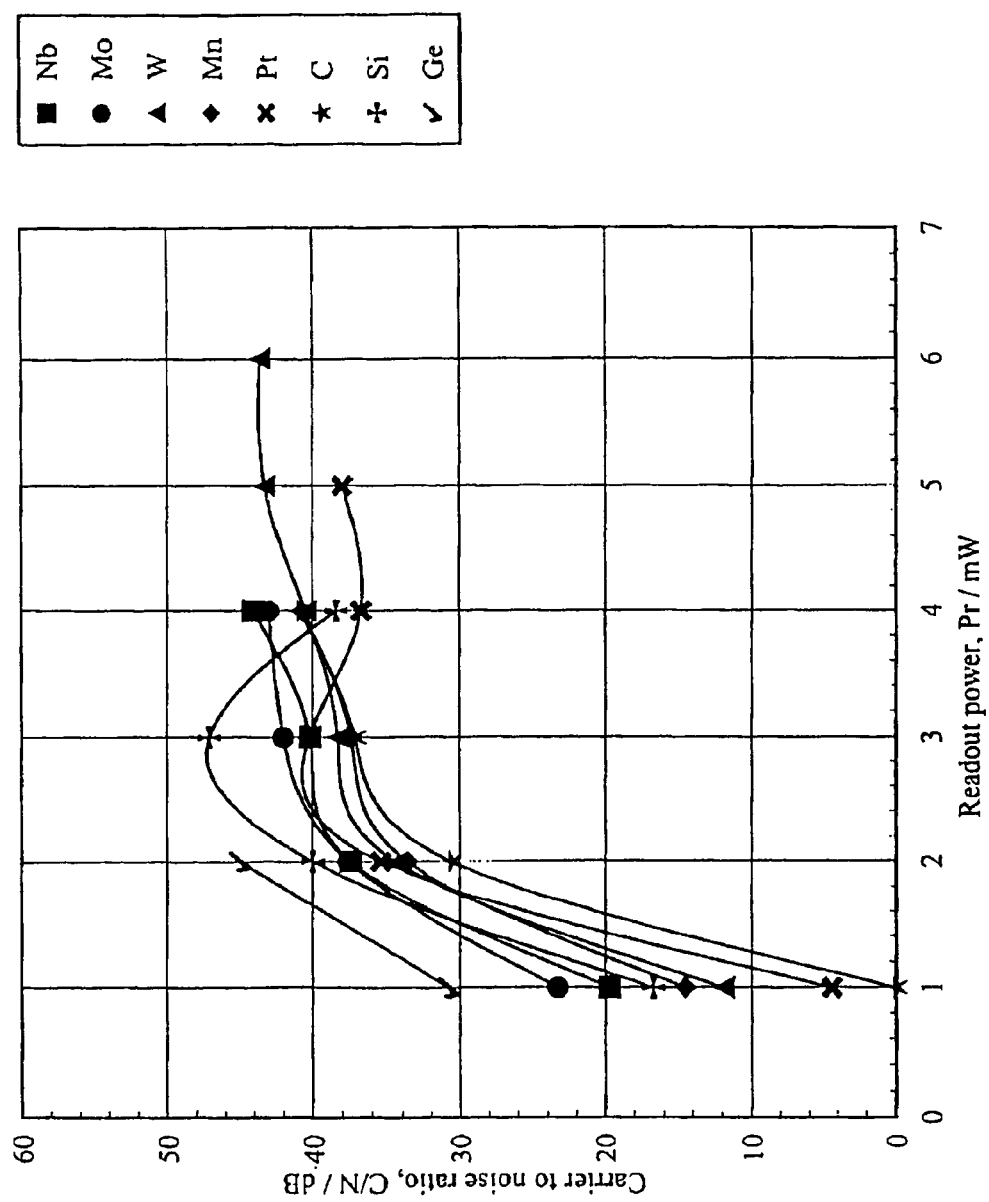
FIG. 9 is a graph of C/N versus readout power.
Figure 10:
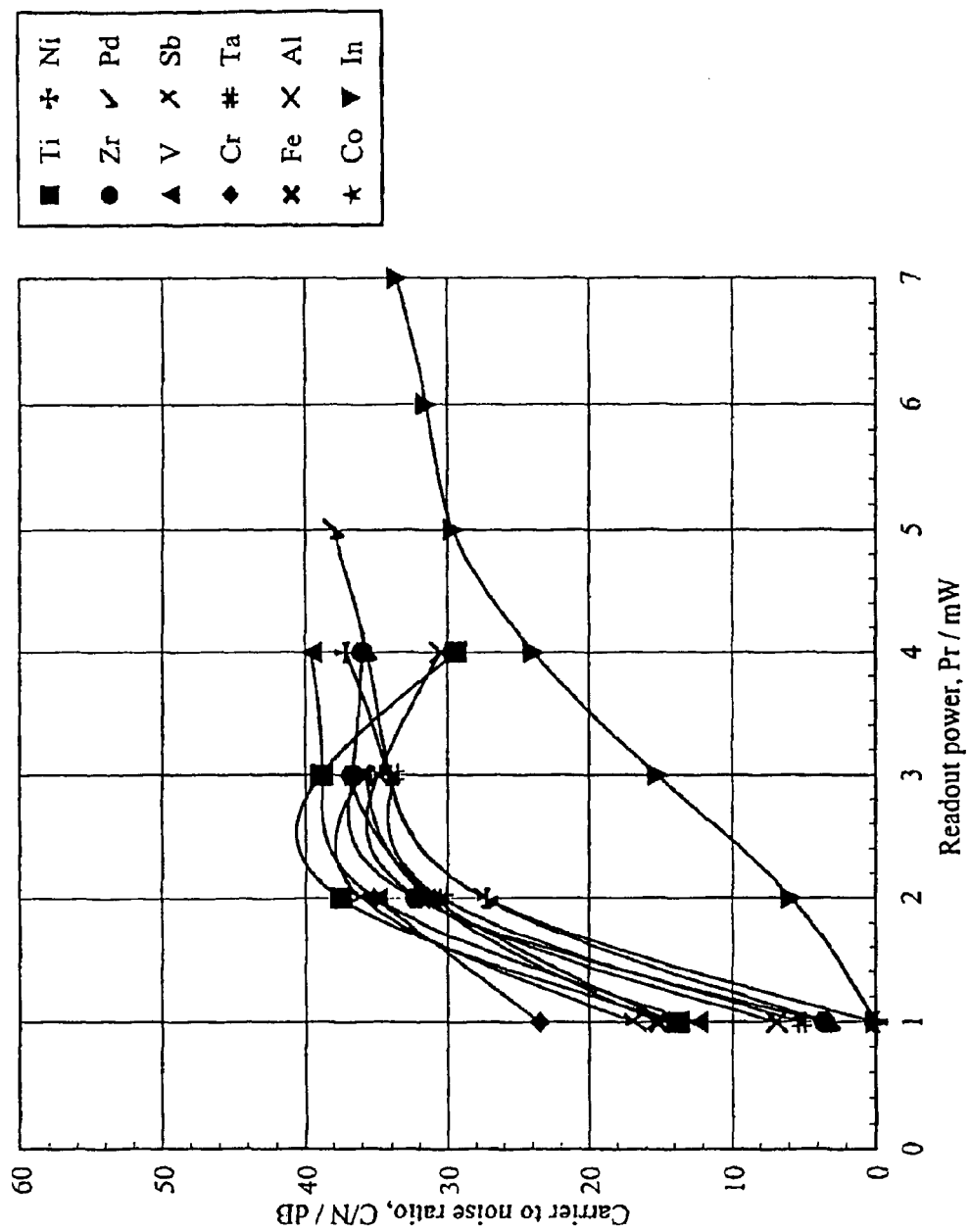
FIG. 10 is a graph of C/N versus readout power.
Figure 11:
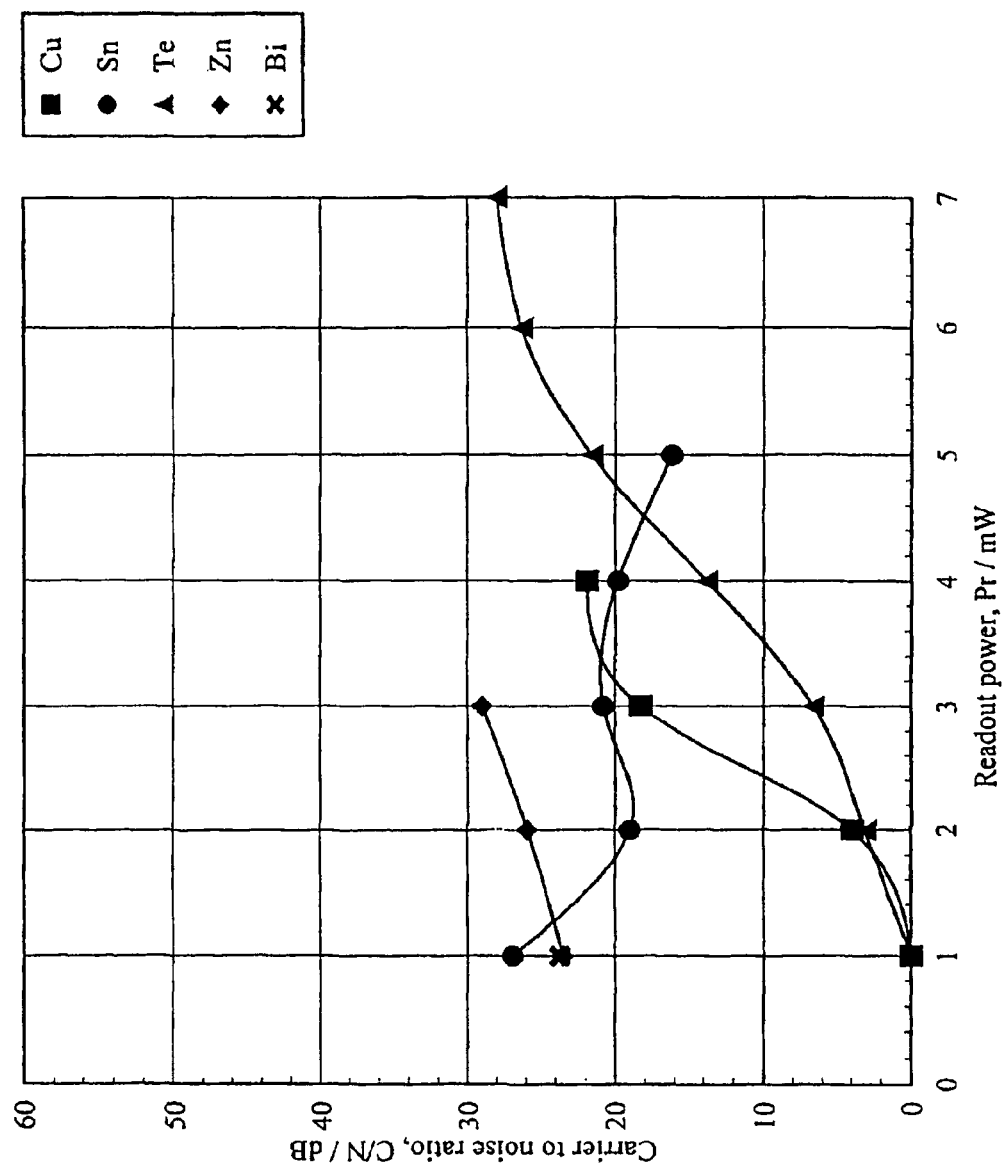
FIG. 11 is a graph of C/N versus readout power.
Figure 12:
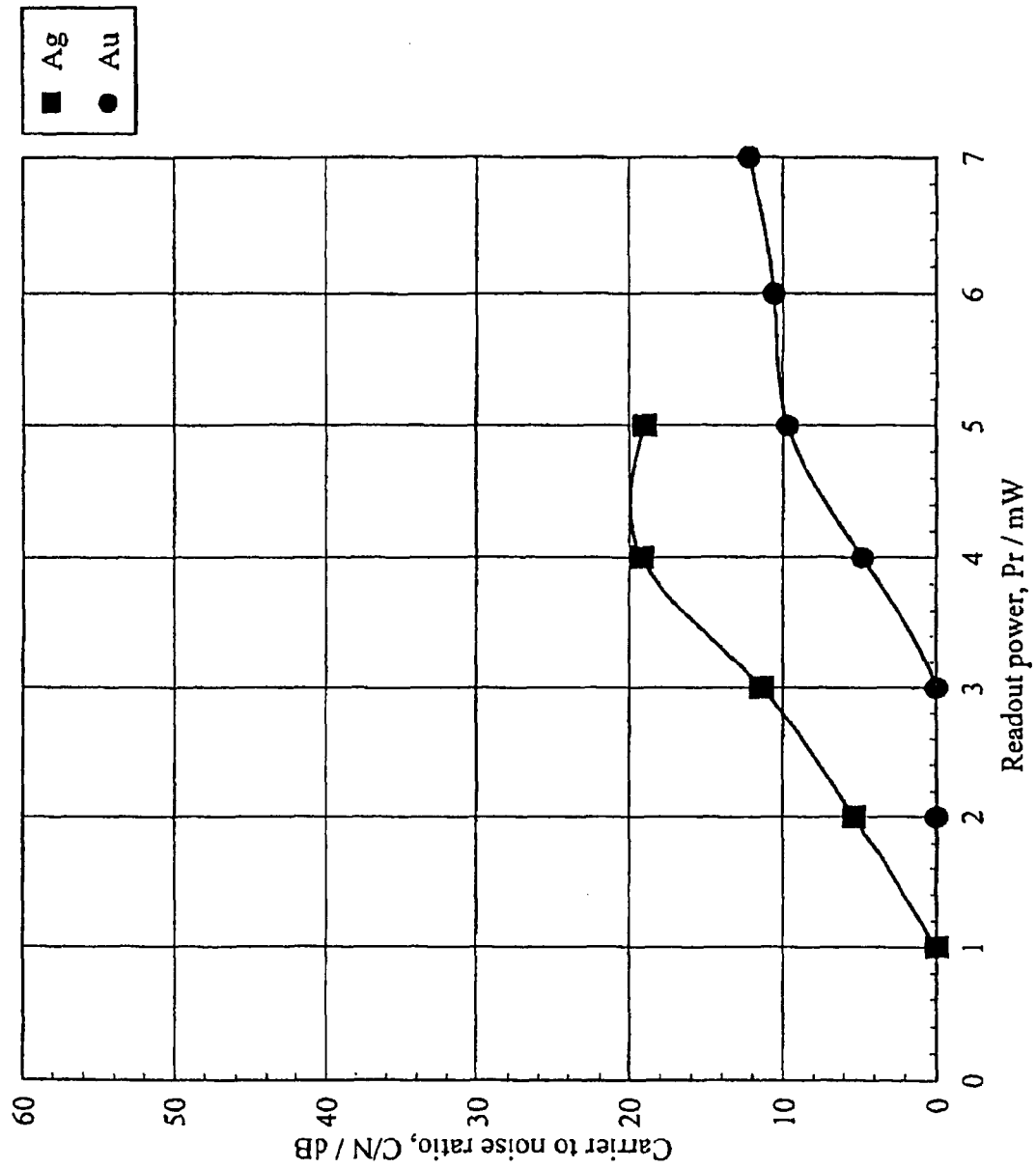
FIG. 12 is a graph of C/N versus readout power.

FIGS. 7 and 8 show the results of an experiment demonstrating the benefits of the first embodiment of the invention. This experiment used an optical disc having a phase change recording layer, a readout wavelength λ of 405 nm and a numerical aperture NA of 0.85.

FIG. 7 is a graph of C/N versus mark length when the readout power Pr is 0.5 mW in accordance with the first embodiment of the invention and 0.3 mW outside the scope of the invention. FIG. 8 is a graph of C/N versus readout power Pr when recorded marks of different length are read out. FIGS. 7 and 8 demonstrate the benefits of the invention, and it is also evident from FIGS. 7 and 8 that in proximity to the resolution limit (0.119 μm), the C/N improves as the readout power Pr rises.

It is noted that the optical disc used in the experiment the results of which are shown in FIGS. 7 and 8 includes a reflective layer, a second dielectric layer, a recording layer, a first dielectric layer and a light transmitting layer stacked in order on a supporting substrate. Recording/reading light enters the recording layer through the light transmitting layer. The supporting substrate used was a polycarbonate disc having a diameter of 120 mm and a thickness of 1.2 mm in which grooves are formed at the same time as injection molding of the disc itself. The reflective layer was 100 nm thick and formed of $Ag_{98}Pd_1Cu_1$. The second dielectric layer was 20 nm thick and formed of $Al_2O_3$. The recording layer was 12 nm thick and had the composition (atomic ratio) of $In_{1.1}Sb_{74.6}Te_{18.6}Ge_{5.7}$. The first dielectric layer was 130 nm thick and formed of 80 mol % ZnS and 20 mol % $SiO_2$. The light transmitting layer was 100 μm thick and formed by spin coating a UV-curable resin, followed by UV curing.

As the benefits of the invention are accomplished with not only recording media, but also read-only media according to the second embodiment using the readout optical system having a large λ/NA value, the benefits of the invention are also accomplished with read-only media according to the first embodiment using the readout optical system having a small λ/NA value.

The optical information medium according to the invention has an information recording layer. The information recording layer used herein is a layer that has projections and depressions in the form of pits and/or grooves, a layer where recorded marks can be formed, or a layer that has projections and depressions and can form recorded marks. This suggests that the invention is applicable to both read-only media and optical recording media (write-once or rewritable media). In the read-only media, a reflective layer covering pits formed in a substrate surface and composed of a metal, metalloid or compound constitutes the information recording layer. In the optical recording media, the recording layer constitutes the information recording layer. The recording layer may be any of a phase change layer, a layer based on an organic dye, and a layer based on another organic material or inorganic material. The recorded marks may take the form of areas having a different optical constant (e.g., reflectance) from the surrounding, concave areas or convex areas.

We have found that by providing an optical information medium with a layer constructed of a specific material and having an appropriate thickness for the specific material, the optical information medium is given a capability of super-resolution readout based on a mechanism essentially different from the prior art and that pits or recorded marks having a size somewhat larger than the resolution limit can be read out at a significantly higher C/N than in the prior art. The specific material used herein is at least one element selected from among Nb, Mo, W, Mn, Pt, C, Si, Ge, Ti, Zr, V, Cr, Fe, Co, Ni, Pd, Sb, Ta, Al, In, Cu, Sn, Te, Zn, and Bi or an alloy or compound containing that element or elements, with the element or compound thereof being preferred. Herein, the layer capable of super-resolution readout is designated a functional layer. The provision of the functional layer enables to detect pits, grooves or recorded marks of a size falling below the resolution limit determined by light diffraction. As previously described, the information recording layer can be utilized as the functional layer in the practice of the invention.

Application to Medium Structure of FIG. 1

Referring to FIG. 1, there is illustrated one exemplary construction of the optical information medium. The optical information medium 1 shown in FIG. 1 is a read-only medium including a light-transmissive substrate 2 having pits 21 formed on a surface and a layer 10 in close contact with the pitted surface. Reading light comes from below in the figure. The layer 10 serves as the functional layer when it has a specific composition and a specific thickness.

Layer 10 Made of Element or Alloy

Optical disc samples of the structure shown in FIG. 1 were fabricated by the following procedure. The substrate 2 used was a disc which was injection molded from polycarbonate (refractive index n=1.58) to a diameter of 120 mm and a thickness of 0.6 mm in which phase pits were formed simultaneous with injection molding. The substrate 2 is of the banded type that the substrate is provided with a plurality of annular pit-forming regions having helical tracks in a concentric pattern, and pits have an equal length in each pit-forming region. Namely, phase pits of different lengths are formed in a single substrate. The pit length in each pit-forming region is 250 nm. The space between adjacent pits is equal to the pit length. The layer 10 was constructed of any one element selected from among Nb, Mo, W, Mn, Pt, C, Si, Ge, Ti, Zr, V, Cr, Fe, Co, Ni, Pd, Sb, Ta, Al, In, Cu, Sn, Te, Zn, Bi, Au and Ag and has a thickness of 5 to 100 nm. The layer 10 was formed by sputtering.

Using an optical disc tester (laser wavelength 635 nm and numerical aperture 0.60), these samples were measured for carrier to noise (C/N) ratio at a linear velocity of 11 m/s and a readout power changing in the range of 1 to 7 mW. Since the optical disc tester used has a cutoff spatial frequency 2 NA/λ, which is calculated to be:

$$2\ NA/\lambda = 1.89 \times 10^3\ (\text{line pairs/mm}),$$

rows of pits in which the pit length is equal to the space between adjacent pits are readable as long as the spatial frequency is equal to or below $1.89 \times 10^3$ (line pairs/mm). The pit length (=space length) $P_L$ corresponding to the readable spatial frequency is given as $$P_L \geq \lambda/4\ NA = 265\ (\text{nm}).$$

It is then concluded that super-resolution readout is possible if a C/N is obtained from a pit row with a pit length of less than 265 nm.

Tables 1 to 4 show the relationship of C/N to the thickness of the layer 10. In Tables 1 to 4, the highest C/N obtained from the layer 10 of a certain thickness when the readout power is changed between 1 mW and 7 mW is reported for each of different materials of which the layer 10 is made. Table 1 picks up those samples which show a maximum C/N of at least 40 dB, Table 2 picks up those samples which show a maximum C/N of 30 dB to less than 40 dB, Table 3 picks up those samples which show a maximum C/N of 20 dB to less than 30 dB, and Table 4 picks up those samples which show a maximum C/N of less than 20 dB.

TABLE 1

C/N (dB) versus thickness of layer 10
(maximum C/N ≧ 40 dB)

| Layer 10 Material | Thickness of layer 10 (nm) | | | | | | |
|---|---|---|---|---|---|---|---|
| | 5 | 10 | 15 | 20 | 30 | 50 | 100 |
| Nb | 38.4 | — | 34.3 | — | 44.1 | 40.3 | 32.8 |
| Mo | — | 41.2 | 43.0 | — | 39.6 | 26.4 | 9.2 |
| W | 32.2 | 43.0 | 43.6 | 38.2 | 32.7 | 24.3 | 7.7 |
| Mn | 33.2 | 37.6 | 35.3 | — | 40.7 | 35.1 | 22.7 |
| Pt | — | 39.1 | 40.2 | — | 30.2 | 13.2 | 4.3 |
| C | 33.2 | — | — | — | 40.9 | 40.9 | 31.0 |
| Si | 45.5 | 43.2 | 47.1 | — | 41.4 | 44.9 | 40.5 |
| Ge | 37.4 | 41.3 | 45.0 | — | 44.4 | 42.5 | 40.7 |

TABLE 2

C/N (dB) versus thickness of layer 10
(40 dB > maximum C/N ≧ 30 dB)

| Layer 10 Material | Thickness of layer 10 (nm) | | | | | | |
|---|---|---|---|---|---|---|---|
| | 5 | 10 | 15 | 20 | 30 | 50 | 100 |
| Ti | — | 29.6 | 35.4 | 37.2 | 37.5 | 37.4 | 29.8 |
| Zr | — | — | 20.9 | — | — | 36.7 | 28.8 |
| V | 33.1 | — | 31.1 | — | 36.6 | 39.6 | 32.4 |
| Cr | — | 35.2 | 26.8 | — | 20.4 | 11.1 | 4.8 |
| Fe | 28.6 | 29.5 | 35.8 | — | 35.2 | 29.4 | 7.9 |
| Co | — | 31.8 | 37.0 | 39.4 | 35.9 | 26.3 | 6.2 |
| Ni | — | — | 36.3 | — | 37.1 | 28.8 | 5.0 |
| Pd | — | 32.8 | 38.0 | — | 31.4 | 14.5 | 5.4 |
| Sb | — | 29.4 | 35.6 | — | 36.1 | 33.3 | 23.7 |
| Ta | — | 23.3 | 25.0 | — | 31.5 | 33.8 | 21.5 |
| Al | — | 34.9 | 26.4 | — | 0.0 | 0.0 | 0.0 |
| In | 33.6 | 24.2 | 21.3 | — | 27.9 | 25.9 | 22.2 |

TABLE 3

C/N (dB) versus thickness of layer 10
(30 dB > maximum C/N ≧ 20 dB)

| Layer 10 Material | Thickness of layer 10 (nm) | | | | | | |
|---|---|---|---|---|---|---|---|
| | 5 | 10 | 15 | 20 | 30 | 50 | 100 |
| Cu | — | 21.9 | 0.0 | — | 7.6 | 9.3 | 8.6 |
| Sn | — | 25.5 | 26.9 | — | 21.0 | 9.9 | 3.7 |
| Te | 28.0 | 23.6 | 25.9 | — | 27.0 | 24.0 | 18.0 |
| Zn | 0.0 | 0.0 | 12.8 | — | 0.0 | 29.0 | 10.6 |
| Bi | 0.0 | 0.0 | 0.0 | — | 13.0 | 23.7 | 11.4 |

TABLE 4

C/N (dB) versus thickness of layer 10
(maximum C/N < 20 dB)

| Layer 10 Material | Thickness of layer 10 (nm) | | | | | | |
|---|---|---|---|---|---|---|---|
| | 5 | 10 | 15 | 20 | 30 | 50 | 100 |
| Ag | 19.2 | 7.4 | 7.8 | — | 0.0 | 0.0 | 0.0 |
| Au | 12.2 | 8.9 | 5.6 | 4.9 | 8.3 | 5.5 | 7.1 |

It is evident from Tables 1 to 4 that the thickness of the layer 10 must be optimized for a particular element used in order that super-resolution readout become possible. For example, as seen from Table 2, super-resolution readout is possible when the layer 10 is an Al layer and has a thickness of 15 nm. However, when the Al layer has a thickness of 100 nm, which is approximate to the thickness of the reflective layer in conventional ROM discs such as CD-ROM and DVD-ROM, super-resolution readout becomes impossible like conventional ROM discs.

Only for those samples producing a maximum C/N among the above samples, FIGS. 9 to 12 show C/N relative to readout power Pr. The samples shown in FIGS. 9 to 12 correspond to the samples shown in Tables 1 to 4, respectively. The C/N was measured on a pit row with a pit length of 250 nm. The C/N measurement used the same optical disc tester as above and a linear velocity of 11 m/s. It is seen from FIGS. 9 to 12 that in most samples, C/N increases with an increasing readout power. Although the signal intensity is not shown in these diagrams, the signal intensity shows the same behavior as the C/N. In FIGS. 9 to 12, the samples lacking data on the high Pr region are those samples which failed to produce readout signals on account of degradation of the layer 10 at such Pr or mean that no data were available due to saturation of the reflected light detecting system of the tester.

Figure 13:
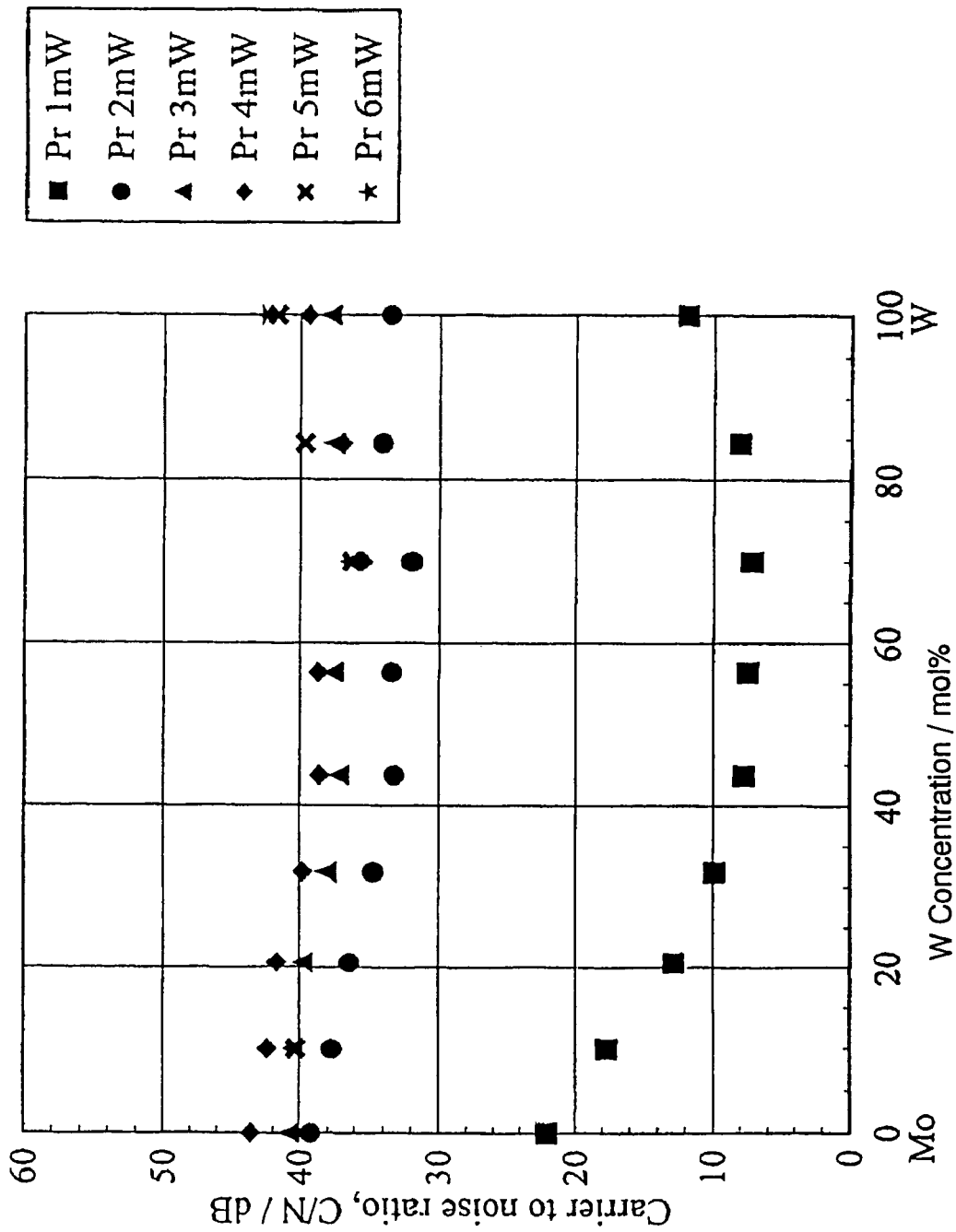
FIG. 13 is a graph of C/N versus a tungsten content in Mo—W alloy.

Further, a sample having the layer 10 made of a tungsten-molybdenum (W—Mo) alloy having a thickness of 15 nm was measured for C/N along a pit row with a pit length of 250 nm using the same optical disc tester as above at a linear velocity of 11 m/s. The results are shown in FIG. 13. It is seen from FIG. 13 that super-resolution readout is also possible when an alloy is used.

It is noted that although the above experiments evaluated C/N for those media having rows of pits whose size was smaller than the resolution limit, similar effects were accomplished for those media having rows of pits whose size was equal to or greater than the resolution limit and equal to or less than $0.31\lambda/NA$. Namely, when the thickness of the layer 10 is properly set in accordance with the particular material thereof, a C/N improvement over media having an aluminum layer of 100 nm thick is observable.

Layer 10 Made of Compound

Even when the layer 10 is constructed of various compounds such as nitrides, oxides, fluorides, sulfides, and carbides, the optical information medium of the invention is also capable of super-resolution readout and capable of improving C/N in reading out objects having a size slightly larger than the resolution limit, and intrinsic effects are exerted. It is noted that the compounds used herein are not limited to stoichiometric compounds and encompass mixtures of metals or metalloids with nitrogen, oxygen, etc. in a proportion less than the stoichiometric composition. Namely, the layer 10 falls within the scope of the invention that contains a metal or metalloid which is capable of super-resolution readout when used in an elemental or alloy form and additionally, another element, preferably at least one element selected from among nitrogen, oxygen, fluorine, sulfur and carbon. The construction of the layer 10 from such compounds is effective for spreading the readout power margin, improving the C/N, and suppressing degradation of C/N by repetitive reading. For the layer 10 constructed of compounds, operation and results are described below.

First, the improvement in chemical stability of the layer 10 due to compound formation is described together with the concomitant advantages. In general, metals excluding noble metals (e.g., Au) or metalloids naturally produce in the form of compounds such as oxides and sulfides. This fact indicates that in the ordinary environment, metals or metalloids are more stable when present in compound form than in pure elemental form. That is, metals or metalloids are significantly improved in chemical stability by converting them into compounds. On the other hand, the degradation of the layer 10 by high power reading and repetitive reading is presumably due to a chemical change (typically oxidation) caused by a temperature rise of the layer 10. Since the layer 10 is in contact with air, it is susceptible to degradation by heating during application of readout power. However, if the layer 10 is formed of a compound, it is restrained from a chemical change. Then, reading becomes possible with a higher power, the maximum C/N is improved, and the degradation of C/N by repetitive reading is restrained. Therefore, the formation of the layer 10 from a compound is quite effective when a material which undergoes degradation at a relatively low readout power is used.

Next, the increase in transparency of the layer 10 due to compound formation is described together with the concomitant advantages. When the layer 10 is formed of a compound, its transparency increases, and its optical reflectance lowers accordingly. When the layer 10 is reduced in optical reflectance, it becomes unlikely that the reflected light detecting system is saturated. This results in an increase of the permissible readout power and hence an improvement in maximum C/N. Since the layer 10 formed of a compound is improved in transparency per unit thickness, the layer 10 of a compound avoids saturation of the reflected light detecting system even when the layer 10 is made thicker. For this reason, the thickness range of the layer 10 within which super-resolution readout is possible is significantly expanded. Therefore, the formation of the layer 10 from a compound is quite effective when a material which causes the reflected light detecting system to be saturated at a relatively low readout power is used.

In order that the layer 10 be formed of a compound, use is preferably made of a reactive sputtering technique using a reactive gas such as nitrogen or oxygen or a sputtering technique using a compound target. Other techniques such as CVD may also be utilized.

Thickness of Layer 10

As seen from the results of the above-described experiments, the layer which is constructed of an elemental metal or metalloid should preferably have the following thickness, which is given for the respective elements.

Nb: up to 100 nm
Mo: up to 70 nm, especially up to 45 nm
W: up to 70 nm, especially up to 40 nm
Mn: up to 100 nm, especially up to 70 nm
Pt: up to 40 nm, especially up to 30 nm
C: up to 100 nm
Si: up to 100 nm
Ge: up to 100 nm
Ti: up to 100 nm
Zr: up to 100 nm, especially 25 to 100 nm
V: up to 100 nm
Cr: up to 30 nm, especially less than 15 nm
Fe: up to 80 nm, especially up to 50 nm
Co: up to 70 nm, especially up to 45 nm
Ni: up to 70 nm, especially up to 50 nm
Pd: up to 40 nm, especially up to 30 nm
Sb: up to 100 nm, especially up to 60 nm
Ta: up to 100 nm, especially up to 60 nm
Al: up to 20 nm, especially less than 15 nm
In: up to 100 nm, especially less than 10 nm
Cu: up to 10 nm
Sn: up to 40 nm
Te: up to 70 nm
Zn: 40 to 90 nm
Bi: 25 to 70 nm It is noted that for those elements which produce a satisfactorily high C/N even at a thickness of 100 nm, the thickness upper limit of 100 nm need not be set from the performance standpoint, but limiting the thickness to 100 nm or less is preferred for preventing a productivity drop. Also preferably, the layer 10 should have a thickness of at least 2 nm regardless of the element of which the layer is made. If the layer 10 is too thin, the reflectance may become too low for the tracking servo system to perform well, failing to produce a satisfactory C/N.

When the layer 10 is formed of compounds, the appropriate thickness range of the layer 10 is expanded as described above.

Now the functional layer constructed by an alloy is described. By the term "functional element" used below is meant an element which alone can construct the functional layer.

When the functional layer is constructed by a binary alloy in the simple solid solution form as typified by the above-described W—Mo alloy wherein both the elements are functional elements, the alloy layer serves as the functional layer as seen from FIG. 13.

For an alloy layer in the simple solid solution form, it is desired that at least one, preferably all of the constituent elements be functional elements. The molar proportion of functional elements is preferably at least 50% of the entire constituent elements.

Like the alloy layer in the simple solid solution form, it is desired for an amorphous alloy layer such as a magneto-optical recording material layer that at least one, preferably all of the constituent elements be functional elements. The molar proportion of functional elements is preferably at least 50% of the entire constituent elements.

Ag—In—Sb—Te base phase change materials are phase separation type alloys in which the Sb phase separates from other phases upon crystallization. For such a phase separation type alloy, it is desired that at least one, preferably all of the constituent phases can construct a functional layer alone. For example, the Sb phase in a crystallized Ag—In—Sb—Te alloy serves as a functional layer alone.

Like the single element layer, the alloy layer must satisfy the thickness requirement in order to serve as the functional layer. For example, the alloy layer in the simple solid solution form may be set to a sufficient thickness for a single element layer of each functional element to serve as the functional layer, as shown in FIG. 13.

The specific composition and thickness of an alloy layer are preferably determined only after it is actually inspected whether an alloy layer having a particular composition and thickness serves as the functional layer. For example, intermetallic compounds such as the above-described phase change material of $Ge_2Sb_2Te_5$ often exhibit a behavior unexpected from the respective constituent elements alone.

Reading Method

In the medium of the invention, an upper limit is imposed on the applicable readout power, depending on the material of the layer 10 and the structure of the medium. It is therefore convenient that an optimum readout power for these conditions is previously recorded in the medium of the invention. Then, the optimum readout power can be read out before the start of reading operation, and the reading operation be performed with this optimum power. Also, if necessary, a trial reading operation may be performed to determine the optimum readout power.

Japanese Patent Application Nos. 2001-123521 and 2002-093026 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An information readout method for an optical information medium comprising an information recording layer having pits or recorded marks with a smallest size $P_L$ and representative of information data, said method comprising:

irradiating a laser beam having a wavelength $\lambda$ of 400 to 410 nm to the information recording layer through an objective lens having a numerical aperture NA of 0.70 to 0.85 for providing readings of the pits or recorded marks, and the smallest size $P_L$ is $0.21\lambda/\mathrm{NA}$ to $0.25\lambda/\mathrm{NA}$, wherein when the laser beam is irradiated through the objective lens to the pits or recorded marks having a size approximate to and slightly greater than a resolution limit $0.21\lambda/\mathrm{NA}$, the laser beam has a power Pr of at least 0.4 mW.

2. The information readout method of claim 1, wherein the power Pr is at least 0.45 mW.

3. The information readout method of claim 1, wherein the power Pr is at least 0.5 mW.

4. The information readout method according to claim 1, wherein the information recording layer is made of at least one of the members selected from the group consisting of Nb, Mo, W, Mn, Pt, C, Si, Ge, Ti, Zr, V, Cr, Fe, Co, Ni, Pd, Sb, Ta, Al, In, Cu, Sn, Te, Zn, and Bi.

5. The information readout method according to claim 4, wherein said information recording layer enables a detection of said pits or recorded marks below a resolution limit determined by a light diffraction.

6. The information readout method according to claim 1, wherein
in said irradiating, the laser beam is irradiated through a functional layer, provided on the information recording layer, the functional layer being configured to provide super-resolution read out.

7. An information readout method for an optical information medium comprising an information recording layer having pits or recorded marks with a smallest size $P_L$ and representative of information data, said method comprising:

irradiating a laser beam having a wavelength $\lambda$ of 400 to 410 nm to the information recording layer through an objective lens having a numerical aperture NA of 0.70 to 0.85 for providing readings of the pits or recorded marks, and the smallest size $P_L$ is 98.8 to 146.4 nm, wherein when the laser beam is irradiated through the objective lens to the pits or recorded marks having a size approximate to and slightly greater than a resolution limit $0.21\lambda/\mathrm{NA}$, the laser beam has a power Pr of at least 0.4 mW.

8. The information readout method of claim 7, wherein the power Pr is at least 0.45 mW.

9. The information readout method of claim 7, wherein the power Pr is at least 0.5 mW.

10. The information readout method according to claim 7, wherein the information recording layer is made of at least one of the members selected from the group consisting of Nb, Mo, W, Mn, Pt, C, Si, Ge, Ti, Zr, V, Cr, Fe, Co, Ni, Pd, Sb, Ta, Al, In, Cu, Sn, Te, Zn, and Bi.

11. The information readout method according to claim 10, wherein said information recording layer enables a detection of said pits or recorded marks below a resolution limit determined by a light diffraction.

12. The information readout method according to claim 7, wherein
in said irradiating, the laser beam is irradiated through a functional layer, provided on the information recording layer, the functional layer being configured to provide super-resolution read out.

* * * * *